Oct. 24, 1939. E. W. BITZER ET AL Re. 21,242

SPRING TESTER

Original Filed June 11, 1932 2 Sheets-Sheet 1

INVENTORS
Edward W. Bitzer
Herbert W. Johnson
BY Chappell & Earl ATTORNEYS

Oct. 24, 1939. E. W. BITZER ET AL Re. 21,242
SPRING TESTER
Original Filed June 11, 1932 2 Sheets-Sheet 2
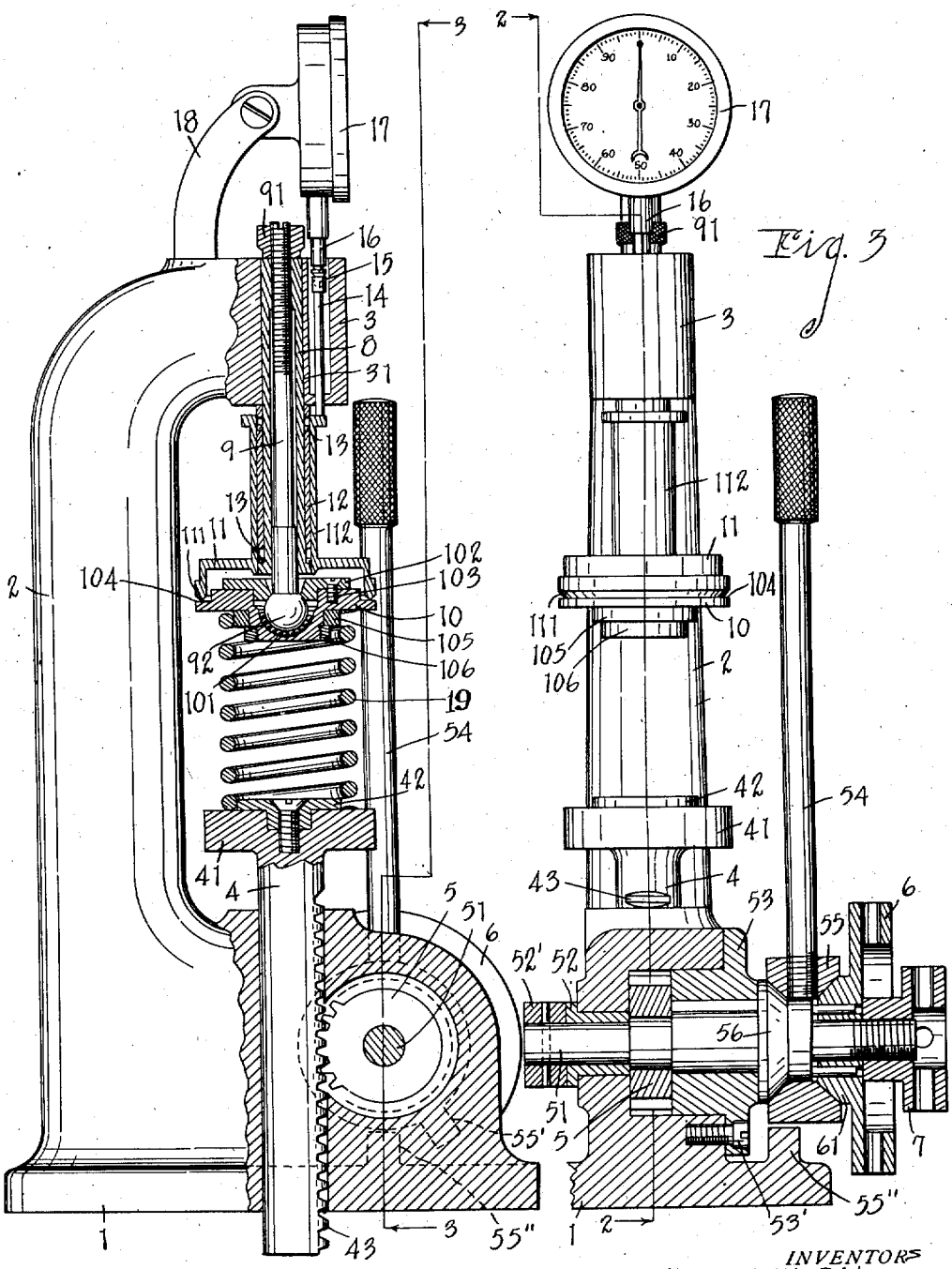
INVENTORS
Edward W. Bitzer
Herbert W. Johnson
BY
Chappell & Earl
ATTORNEYS Reissued Oct. 24, 1939

Re. 21,242

UNITED STATES PATENT OFFICE 21,242

SPRING TESTER

Edward W. Bitzer and Herbert W. Johnson, Muskegon, Mich., assignors to American Coil Spring Company, Muskegon, Mich.

Original No. 1,992,987, dated March 5, 1935, Serial No. 616,632, June 11, 1932. Application for reissue September 14, 1935, Serial No. 41,406

14 Claims. (Cl. 73—51)

This invention relates to improvements in spring testers. The tester, of course, is available for testing or gauging any article to which it might be applied to determine whether or not a surface is exactly square and true.

The object of the invention is to determine the trueness and accuracy of construction of a coil spring such as a valve spring. Valve springs especially should be so constructed as to exert an even pressure on all sides of the valve or an exactly central pressure, so that the valve will seat and close effectively at all points of its circumference.

Objects pertaining to details and economies of construction and operation will appear from the description to follow. Preferred embodiments of our invention are illustrated in the accompanying drawings, in which:

Fig. 2 is an enlarged detail elevation view partially in section on the plane of line 2—2 of Fig. 3;

Fig. 3 is a front elevation view partially in section on the plane of line 3—3 of Fig. 2;

Figure 1:
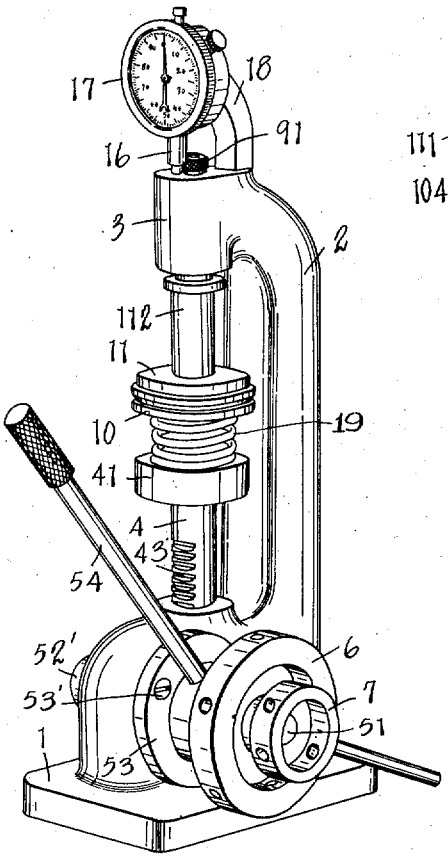
Fig. 1 is a perspective view of our improved spring tester with a spring in position under compression.

The parts will be identified by their numerals of reference which are the same in all the views.

1 is the base. 2 is the standard carried thereby and 3 is the head for supporting the column carrying the swivel test head. 4 is the test plunger with a disk-like head 41 at the top carrying a guide 42 for the bottom coil of a spring being tested. This guide is removable and may be replaced by one of suitable size to test any spring or article under test.

The plunger 4 has a rack 43 formed therein, preferably cut therein. This is engaged by a pinion 5 carried on shaft 51. The shaft is disposed transversely through the base as seen in Fig. 3, being supported by bushing 52 adjacent one end where it is provided with a suitable collar 52'. 53 is a removable bushing held in place by screw 53' and supporting the other end of the shaft. The shaft is provided with a disk or actuating hand wheel 6 exteriorly of the bushing 53 which is clamped in place by lock nut 7, radial holes being provided in these parts for their ready operation by wrench, pin or otherwise. 54 is a rocking lever carried on collar 55 which is clamped in place on the shaft 51 against flange 56 forming a part of said shaft by conical bearing 61 on the hand wheel 6. It will be seen that the plunger 4 is raised or lowered by the operation of the pinion 5. A suitable stop 55' is provided on the collar 55 to limit its motion by contact with the stop 55'' on the base.

In a suitable bushing 8, vertically disposed in a bore 31 in the head 3, is an adjustable column 9. This is screw threaded at its upper end in the bushing 8 and is locked securely in place by the lock nut 91. The lower end is in the form of a bearing ball 92 constituting a member of a ball and socket universal joint.

10 is the swivel testing head provided with a socket bearing for the ball 92, the same being provided with a quantity of anti-frcition balls 101 and being retained in place by cap plate 102 retained in place by screw means 103. The swivel head 10 is provided with a perfectly true, upwardly facing flange 104. It is also provided with a detachable guide 105 for the top coil of a spring to be tested. This is held by a screw nut or ring 106.

A cooperating gauge head 11 with downturned knife edged contacting rim 111 operates with the swivel test head 10. The gauge head 11 is carried by the sleeve 112 which fits and turns and slides upon the sleeve bearing 12 which is castillated at top and bottom to receive bearing balls 13. The sleeve 112 reciprocates and turns very freely on the sleeve 12 and the said bearing balls. From the sleeve 112 extends upwardly a plunger 14 which is provided at its upper end with a universal joint 15 which connects to the pitman 16 that operates a gauge or other suitable indicating means 17. This gauge may be graduated to thousandths of an inch or it may be graduated to degrees and fractions. 18 is the bracket supporting the gauge. 19 is the spring or object to be tested.

When testing springs of any description, the gauge or indicator means employed is adjusted to receive the springs at the maximum working pressure. The tester is first calibrated, preferably by using a true cylindrical block comparable with the spring dimension, so that it is known to be true. The plunger 4 is then lowered, the spring 19 to be tested is placed on the head 41 and adjusted accurately on the guide 42 and is then adjusted on the guide 105 on the swivel head 10. The machine having been previously set to enable the spring to be compressed to its maximum working pressure, the lever 54 is operated and pulled over against the stop 55''. If the spring is exactly true, the swivel plate 10 will not be tipped so that the indicating means employed will not be operated, i. e. the gauge 17 will register zero. If, however, the spring is in the slightest particular out of true, one edge of the swivel plate 10 will be raised higher than the opposite edge. This shows angular reaction out of line with the central axis of the spring, that is, it results in an indication of any distortional transmission of forces in any direction about the periphery of the end of the spring while the same is compressed within its working range. As a result the swivel plate will tip (see the same exaggerated in Fig. 4) and in whichever direction it tips, on that side it will rise above the normal and lift the gauge head 11, thereby carrying up the sleeve 112 and the plunger 14 and actuating the pitman 16 which operates the gauge 17. The structure may be so graduated that variations of a thousandth of an inch can be indicated.

We have not shown the details of the gauge as we deem that unnecessary to properly understand our invention.

Figure 7:
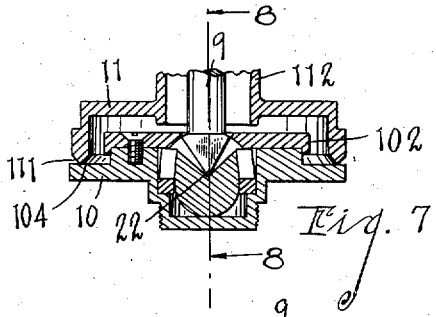
Fig. 7 is a still further modification of swivel test head in which a crossed knife edge bearing is utilized.
Figure 6:
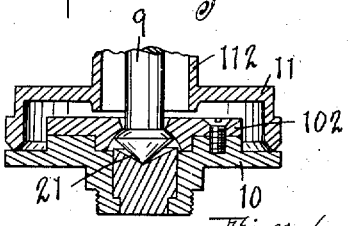
Fig. 6 is a similar detail sectional view of another modification of swivel test head in which a conically pointed bearing and corresponding seat is utilized.
Figure 5:
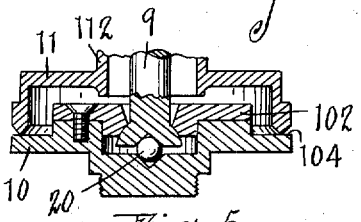
Fig. 5 is a detail sectional view of a modified construction of the swivel head, in which a single ball bearing is utilized.
Figure 4:
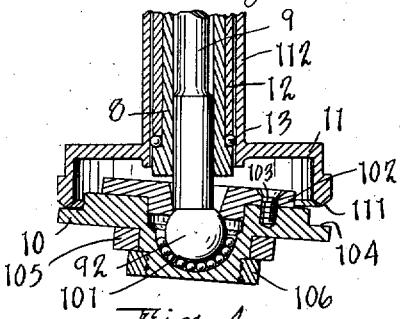
Fig. 4 is an enlarged detail view of the swivel testing head and parts showing the head tipped to an extreme position.
Figure 8:
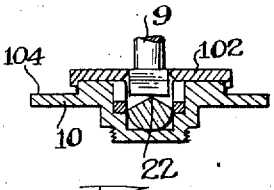
Fig. 8 is a vertical detail sectional view on line 8—8 of Fig. 7, showing details of construction.

We have shown the swivel test head 10 very much tipped in Fig. 4 to make clear its operation. In Fig. 5 we show the same swiveled plate with a simple ball bearing 20. In Fig. 6 we show the same thing with a point bearing 21, and in Fig. 7, we show the same thing with crossed knife edge bearings 22.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. In a spring tester, the combination of a base having a socket, a standard, a head supported by said standard, a plunger in said socket in said base and having a suitable head, a spring guide on said plunger head, a rack and pinion means for actuating the said plunger, an adjustable column in said standard head, a swivel test head having a trued upper surface and a spring contact surface opposed to said plunger, a universal joint connecting said test head to said column, a sleeve slide surrounding and supported by said column, a head on said sleeve slide having a downturned contacting flange to cooperate with the trued upper surface of said swivel test head, a gauge having a support above the said column, and connections from the sleeve slide to said gauge to operate the same to register any angular deflections of the spring.

2. In a spring tester, the combination of a base having a socket, a standard, a head supported by said standard, a plunger in said socket in said base and having a suitable head, a spring guide on said plunger head, means for actuating the said plunger, an adjustable column in said standard head, a swivel test head having a trued upper surface and a spring contact surface opposed to said plunger, a universal knife edge joint connecting said test head to said column, a sleeve slide surrounding and supported by said column, a head on said sleeve slide having a downturned contacting flange to cooperate with the trued upper surface of said swivel test head, a gauge having a support above the said column, and connections from the sleeve slide to said gauge to operate the same to register any angular deflection of the spring.

3. In a spring tester, the combination of a base having a socket, a standard, a head supported by said standard, a plunger in said socket in said base and having a suitable head, a spring guide on said plunger head, means for actuating the said plunger, a column in said standard head, a swivel test head having a trued upper surface and a spring contact surface opposed to said plunger, a universal knife edge joint connecting said test head to said column, a sleeve slide surrounding and supported by said column, a head on said sleeve slide having a downturned contacting flange to cooperate with the trued upper surface of said swivel test head, a gauge having a support above the said column, and connections from the sleeve slide to said gauge to operate the same to register any angular deflection of the spring.

4. In a spring tester, the combination of a base having a socket, a standard, a head supported by said standard, a plunger in said socket in said base and having a suitable head, a spring guide on said plunger head, means for actuating the said plunger, a column in said standard head, a swivel test head having a trued upper surface and a spring contact surface opposed to said plunger, a universal knife edge joint connecting said test head to said column, a slide supported by said column, a head on said slide having a downturned contacting flange to cooperate with the trued upper surface of said swivel test head, a gauge having a support above the said column, and connections from the slide to said gauge to operate the same to register any angular deflection of the spring.

5. In a spring tester, the combination of a base having a socket, a standard, a head supported by said standard, a plunger in said socket in said base and having a suitable head, a spring guide on said plunger head, means for actuating the said plunger, a column in said standard head, a swivel test head having a spring contact surface opposed to said plunger, a universal knife edge joint connecting said test head to said column, a slide supported by said column, a head on said slide having a downturned contacting flange to cooperate with the said swivel test head, a gauge having a support above the said column, and connections from the slide to operate the same to register any angular deflection of the spring.

6. In a spring tester, the combination of a base having a socket, a standard, a head supported by said standard, a plunger in said socket in said base and having a suitable head, a spring guide on said plunger head, a rack and pinion means for actuating the said plunger, an adjustable column in said standard head, a swivel test head having a trued upper surface and a spring contact surface opopsed to said plunger, a universal cone point joint connecting said test head to said column, a sleeve slide surrounding and supported by said column, a head on said sleeve slide having a downturned contacting flange to cooperate with the trued upper surface of said swivel test head, a gauge having a support above the said column, and connections from the sleeve slide to said gauge to operate the same to register any angular deflection of the spring.

7. In a spring tester, the combination of a base having a socket, a standard, a head supported by said standard, a plunger in said socket in said base and having a suitable head, a spring guide on said plunger head, means for actuating the said plunger, an adjustable column in said standard head, a swivel test head having a trued upper surface and a spring contact surface opposed to said plunger, a universal cone point joint connecting said test head to said column, a sleeve slide surrounding and supported by said column, a head on said sleeve slide having a downturned contacting flange to cooperate with the trued upper surface of said swivel test head, a gauge having a support above the said column, and connections from the sleeve slide to said gauge to operate the same to register any angular deflection of the spring.

8. In a spring tester, the combination of a base having a socket, a standard, a head supported by said standard, a plunger in said socket in said base and having a suitable head, a spring guide on said plunger head, means for actuating the said plunger, a column in said standard head, a swivel test head having a trued upper surface and a spring contact surface opposed to said plunger, a universal cone point joint connecting said test head to said column, a sleeve slide surrounding and supported by said column, a head on said sleeve slide having a downturned contacting flange to cooperate with the trued upper surface of said swivel test head, a gauge having a support above the said column, and connections from the sleeve slide to said gauge to operate the same to register any angular deflection of the spring.

9. In a spring tester, the combination of a base having a socket, a standard, a head supported by said standard, a plunger in said socket in said base and having a suitable head, a spring guide on said plunger head, means for actuating the said plunger, a column in said standard head, a swivel test head having a trued upper surface and a spring contact surface opposed to said plunger, a universal cone point joint connecting said test head to said column, a slide supported by said column, a head on said slide having a downturned contacting flange to cooperate with the trued upper surface of said swivel test head, a gauge having a support above the said column, and connections from the slide to said gauge to operate the same to register any angular deflection of the spring.

10. In a spring tester, the combination of a base having a socket, a standard, a head supported by said standard, a plunger in said socket in said base and having a suitable head, a spring guide on said plunger head, means for actuating the said plunger, a column in said standard head, a swivel test head having a spring contact surface opposed to said plunger, a universal cone point joint connecting said test head to said column, a slide supported by said column, a head on said slide having a downturned contacting flange to cooperate with the said swivel test head, a gauge having a support above the said column, and connections from the slide to operate the same to register any angular deflection of the spring.

11. In a spring tester, the combination of a base having a socket, a standard, a head supported by said standard, a plunger in said socket in said base and having a suitable head, a spring guide on said plunger head, a rack and pinion means for actuating the said plunger, an adjustable column in said standard head, a swivel test head having a trued upper surface, and a spring contact surface opposed to said plunger, a universal joint connecting said test head to said column, a sleeve slide surrounding and supported by said column, a head on said sleeve slide to cooperate with the trued upper surface of said swivel test head, a gauge having a support above the said column, and connections from the sleeve slide to said gauge to operate the same to register any angular deflection of the spring.

12. In a spring tester, the combination of a base having a socket, a standard, a head supported by said standard, a plunger in said socket in said base and having a suitable head, a spring guide on said plunger head, means for actuating the said plunger, a column in said standard head, a swivel test head having a spring contact surface opposed to said plunger, a universal joint connecting said test head to said column, a slide supported by said column, a head on said slide to cooperate with the said swivel test head, a gauge having a support above the said column, and connections from the slide to operate the same to register any angular deflection of the spring.

13. In a spring tester, the combination of a base having a socket, a standard, a head supported by said standard, a plunger in said socket in said base and having a suitable head, a spring guide on said plunger head, means for actuating the said plunger, a column in said standard head, a swivel test head having a trued upper surface and a spring contact surface opposed to said plunger, a universal cone point joint connecting said test head to said column, a sleeve slide surrounding and supported by said column, a head on said sleeve slide to coperate with the trued upper surface of said swivel test head, a gauge having a support above the said column, and connections from the sleeve slide to said gauge to operate the same to register any angular deflection of the spring.

14. In a spring tester, the combination of a base having a socket, a standard, a head supported by said standard, a plunger in said socket in said base and having a suitable head, a spring guide on said plunger head, means for actuating the said plunger, a column in said standard head, a swivel test head having a spring contact surface opposed to said plunger, a universal cone point joint connecting said test head to said column, a slide supported by said column, a head on said slide to cooperate with the said swivel test head, a gauge having a support above the said column, and connections from the slide to operate the same to register any angular deflection of the spring.

EDWARD W. BITZER.
HERBERT W. JOHNSON.